United States Patent
Stuart et al.

(10) Patent No.: US 10,231,076 B1
(45) Date of Patent: Mar. 12, 2019

(54) SYSTEMS AND METHODS FOR PROVIDING CONTEXTUAL RECOMMENDATIONS

(71) Applicant: Wells Fargo Bank, N.A., San Francisco, CA (US)

(72) Inventors: Gail Elizabeth Stuart, Daleville, VA (US); Andrew J. Garner, IV, State Road, NC (US); Daniel S. Sumner, Matthews, NC (US); Prasanna Kumar Ammiraju, Hyderabad (IN); Dibyendu Chatterjee, Hyderabad (IN); Kshitindra Kumar Jain, Hyderabad (IN); Rameshchandra Bhaskar Ketharaju, Hyderabad (IN); Dinakar Channakal Krishnappa, Yelahanka (IN); Ravindar Rao Perala, Beeramguda (IN); Dinesh Sangtani, Hyderabad (IN); Mohan Gopal Kanala, Hyderabad (IN); Prashanth Kumar Merugu, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 15/268,223

(22) Filed: Sep. 16, 2016

(51) Int. Cl.
*H04W 4/02* (2018.01)
*H04M 3/523* (2006.01)
*G06Q 20/32* (2012.01)

(52) U.S. Cl.
CPC ......... *H04W 4/02* (2013.01); *G06Q 20/3221* (2013.01); *H04M 3/523* (2013.01)

(58) Field of Classification Search
CPC ........ H04M 1/72569; H04M 1/72572; H04M 1/72566; H04M 1/72547

USPC ............ 379/265.13, 265.11, 266.08, 207.12
See application file for complete search history.

(56) References Cited

U.S. PATENT DOCUMENTS

| | | |
|---|---|---|
| 6,349,290 B1 | 2/2002 | Horowitz et al. |
| 6,411,687 B1 | 6/2002 | Bohacek et al. |
| 8,130,935 B1 | 3/2012 | Coughlan et al. |
| 8,255,284 B1 | 8/2012 | Ramalingam et al. |
| 8,296,205 B2 | 10/2012 | Zoldi |
| 8,532,628 B2 | 9/2013 | Kalinichenko et al. |
| 8,600,019 B1 | 12/2013 | Cooper et al. |
| 8,600,734 B2 | 12/2013 | Warner |
| 8,620,675 B2 | 12/2013 | Dong et al. |

(Continued)

OTHER PUBLICATIONS

"Alert Engine", Bank Innovation, [Online]. [Accessed Dec. 28, 2015]. Retrieved from the Internet: <URL: http://bankinnovation.net/2013/07/alert-engine/>, (Jul. 25, 2013), 4 pgs.

(Continued)

*Primary Examiner* — Thjuan K Addy
(74) *Attorney, Agent, or Firm* — Schwegman Lundberg & Woessner, P.A.

(57) ABSTRACT

A method may include receiving, from a customer device, contextual location information about a customer and an interaction type, determining a location-based recommendation and an urgency level for the customer using the contextual location information, generating a routing protocol for communication with the customer based on the interaction type and the urgency level, and providing a communication to the customer according to the routing protocol, the communication including the location-based recommendation.

20 Claims, 4 Drawing Sheets

(56) References Cited

U.S. PATENT DOCUMENTS

| | | |
|---|---|---|
| 8,686,852 B2 | 4/2014 | Ben-Dayan et al. |
| 8,751,346 B2 | 6/2014 | Maisonneuve |
| 8,903,739 B1 | 12/2014 | Janiczek et al. |
| 8,917,853 B2 | 12/2014 | Dheap et al. |
| 9,008,283 B2 | 4/2015 | Riahi et al. |
| 9,042,540 B2 | 5/2015 | Tuchman et al. |
| 9,058,340 B1 | 6/2015 | Chamberlain et al. |
| 9,083,804 B2 | 7/2015 | Conway et al. |
| 9,092,801 B2 | 7/2015 | Chang et al. |
| 9,098,545 B2 | 8/2015 | Abyanker |
| 9,105,268 B2 | 8/2015 | Srivastava et al. |
| 9,106,748 B2 | 8/2015 | Conway et al. |
| 9,124,694 B2 | 9/2015 | Monegan et al. |
| 9,407,751 B2 * | 8/2016 | Hansen ................. G06F 9/4451 |
| 2005/0163302 A1 | 7/2005 | Mock et al. |
| 2009/0164387 A1 | 6/2009 | Armstrong et al. |
| 2009/0216750 A1 * | 8/2009 | Sandoval .......... G06F 17/30569 |
| 2010/0114654 A1 | 5/2010 | Lukose et al. |
| 2010/0131398 A1 | 5/2010 | Molloy et al. |
| 2012/0195422 A1 | 8/2012 | Famous |
| 2012/0209773 A1 | 8/2012 | Ranganathan |
| 2012/0233258 A1 | 9/2012 | Vijayaraghavan et al. |
| 2013/0282430 A1 | 10/2013 | Kannan et al. |
| 2013/0282595 A1 | 10/2013 | Vijayaraghavan et al. |
| 2014/0119531 A1 | 5/2014 | Tuchman et al. |
| 2014/0195378 A1 | 7/2014 | Sri et al. |
| 2014/0222636 A1 | 8/2014 | Cheng et al. |
| 2014/0249873 A1 | 9/2014 | Stephan et al. |
| 2014/0279123 A1 | 9/2014 | Harkey et al. |
| 2014/0282135 A1 | 9/2014 | Segre |
| 2014/0365314 A1 | 12/2014 | Torrens et al. |
| 2015/0235240 A1 | 8/2015 | Chang et al. |
| 2016/0127555 A1 | 5/2016 | Hanson et al. |
| 2016/0350383 A1 * | 12/2016 | Lim ................. G06F 17/30528 |

OTHER PUBLICATIONS

"U.S. Appl. No. 15/272,053, Non Final Office Action dated May 16, 2018", 18 pgs.

Cavanaugh, K., "Achieving intelligent interactions with analytical CRM", DM Review, v 11, n 5, 44, 46-7, May 2001; ISSN: 1521-2912; Publisher: Faulkner & Gray, USA, (2001), 6 pgs.

* cited by examiner

SYSTEMS AND METHODS FOR PROVIDING CONTEXTUAL RECOMMENDATIONS

TECHNICAL FIELD

This disclosure generally relates to contextual recommendations in general and in particular to location-based recommendation communications.

BACKGROUND

Interacting with banks can be cumbersome and daunting for customers. As customers navigate their lives, their interactions and banking needs often change based on geography and location. Typically, customers must communicate their banking needs to a bank directly. This leaves customers feeling frustrated when their needs are not immediately fulfilled. Another issue with customer driven identification of banking needs is that often customers are unable to accurately communicate those banking needs themselves.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Systems and methods for providing contextual recommendations are described herein. The contextual recommendations may include communications to a customer of a bank. The contextual recommendations may be based on a location of the customer or a customer's device. The contextual recommendations may include a communication to the customer or the customer's device recommending actions. For example, the contextual recommendations may include a link, a phone number, an automated teller machine (ATM) location, a bank branch location, a mobile bank location, or the like. The communication may be based on geography or external events, for example, in conjunction with a customer's profile information. External events such as, social events, weather, or other events not associated with the bank may be used to create the contextual recommendations.

In an example, a contextual recommendation is generated by predicting a customer need based on a location of the customer or a device of the customer. In an example, a probability, such as a probability of a need based on the location may be determined. For example, a media source, app data, or other information may be used to predict possible issues the customer may be experiencing.

In an example, a method may include receiving a contact from a customer, determining a location of the customer before or during the contact, and looking at a history of the customer's location information (e.g., determine location pattern, or travel pattern). The location may be determined using location-based services from a mobile device of the customer, a registered device, a registered home device, a location proximate to a landmark or device with a known location (e.g., a beacon, an ATM, a cell tower, etc.), a location of recent transactions or current transactions to determine pattern, or the like. In another example, a predetermined registration of locations of travel may be used, and may be compared to an active travel pattern. In another example, a social chat history may be used to determine a location. When a precise location is not determined, the method may include predicting an approximate location with a probability (e.g., based on social interactions or social media, e-mail, travel itinerary, etc.). The method may include collecting other information related to that location, such as weather, emergency broadcasts, news feeds, traffic, social media in that area, transit notifications, or the like. The method may include generating a prediction of a need and determining an urgency of the need. The method may include determining an action to take based on the need and the urgency, such as sending a text to the customer, routing the customer to an agent for solution, providing information targeted to the need or to the environment, suggesting alternate or more relevant contact information, closing an account of the customer, issuing a fraud alert, or the like. In another example, the method may include issuing a fraud alert if a location does not match a predetermined pattern or a location of recent transactions.

Figure 1:
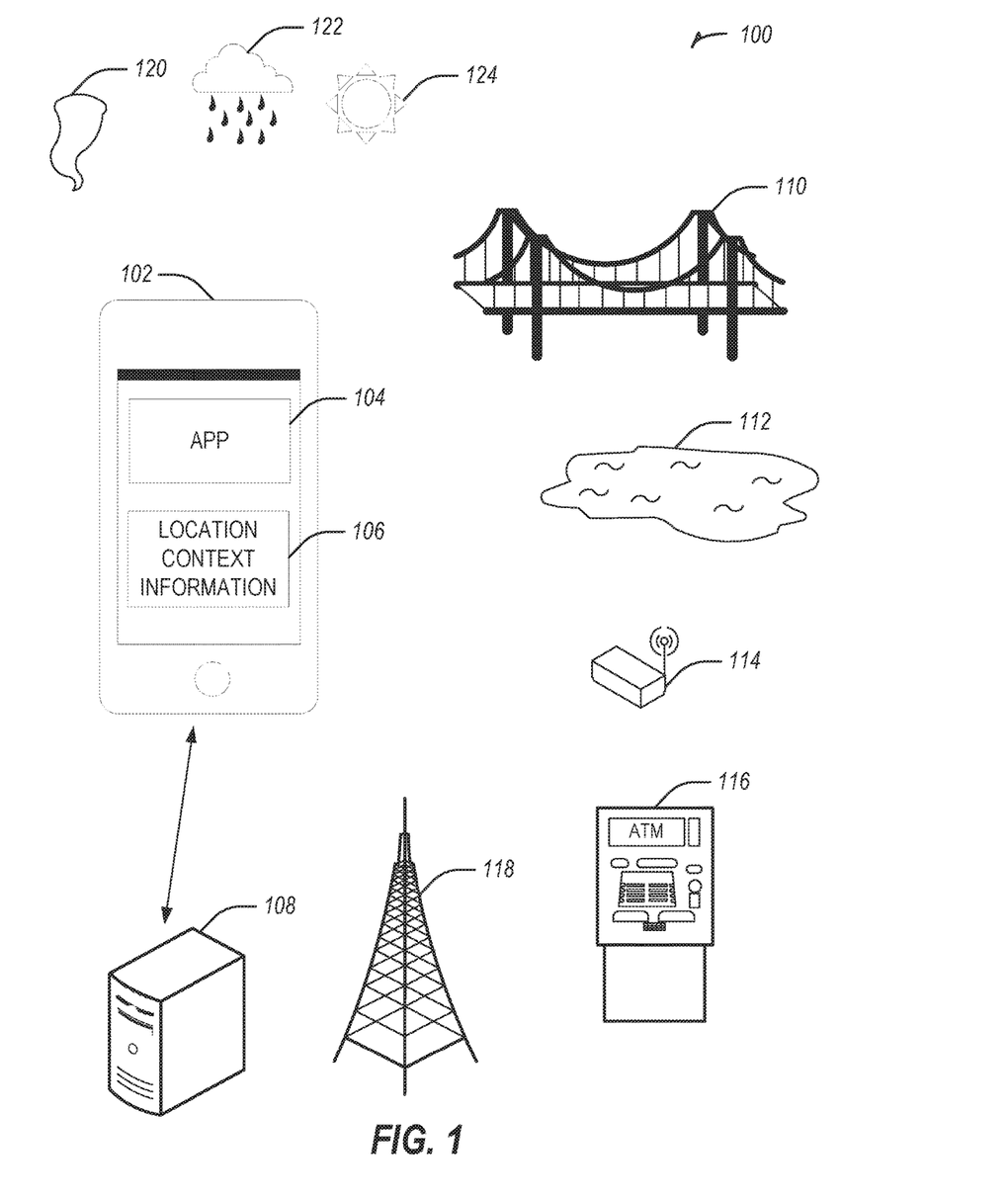
FIG. 1 illustrates a contextual recommendation system in accordance with some embodiments.

FIG. 1 illustrates a contextual recommendation system 100 in accordance with some embodiments. The system includes a customer device 102. The customer device 102 may be in communication with a server 108. The customer device 102 may include an app 104 (e.g., a mobile application, a desktop application, etc.) and location context information 106. The location context information 106 may be determined using one or more available location determination techniques. For example, the location context information 106 may be determined using visible (e.g., from a camera on the customer device 102) features (e.g., a bridge 110 or a lake 112). In an example, the location context information 106 is determined using a global positioning system (GPS). In another example, the location context information 106 is determined by communications between the customer device 102 and nearby devices (e.g., a wireless router 114, an automated teller machine (ATM) 116, or an antenna (e.g., a cell tower) 118). The location context information 106 may include a specific geographical size, that may change based on customer input, customer interaction type, location (e.g., in Montana, use a larger physical area than in New York City), location type (e.g., on an island, exclude areas within the specific geographical size that are not on the island), or contextual recommendation.

In an example, the location context information 106 is determined by news events (e.g., local, national, or global). The news events may include financial news of the stock market melting down, or other local news in a local context that may prompt a customer to do search for services (or need services but not know it yet). For example, a national news event may include a stock market collapse or a corporate bankruptcy. The corporate bankruptcy may impact a specific location disproportionately (e.g., at a plant location or a corporate headquarters), which may be used to make a contextual recommendation. The corporate bankruptcy may impact a particular customer as well, if the customer has a significant position in the corporation, and the customer may benefit from, for example, financial planning services in response to the corporate bankruptcy.

In an example, the location context information 106 is determined using an IP address of the customer device 102 or a preregistration of the customer device 102. In an example, the location context information 106 is based on disasters, such as a terrorist attack or power outage.

In an example, the location context information 106 is determined by local weather attributes, for example, when it is determined that the local weather is severe 120 (e.g., a tornado, lightning, hurricane, tsunami, tidal wave, etc.), raining 122, or sunny 124. The local weather categories may include levels of severity, such as a category storm level, category tornado level, category hurricane level, rainfall severity (e.g., an amount of rain, a likelihood of flooding, lightning, thunder, etc.), heat index warnings, or the like. For example, when the location context information 106 includes a tornado watch or a tornado warning, a location-based recommendation may be received at the customer device 102 indicating a nearby bank branch to take shelter in. In another example, the location context information 106 may indicate rain later in a day, and a location-based recommendation may be sent to the customer device 102 to stop at a nearby ATM before the rain starts, for example, if customer-based historical information indicates that the customer does not own a vehicle. In an example, when a huge snowstorm is predicted to hit in the area of the customer, a recommendation may be made to access an ATM and a food store (e.g., an ATM close to a food store or in a food store).

The location context information 106 may include contextual recommendations based on the location, such as alerting the customer device 102 when the customer device 102 is proximate or within a predetermined range of the ATM 116, a bank branch, or a mobile bank. In another example, the location context information 106 may be used to determine an alert, such as that ATM 116 is the last ATM available before crossing the bridge 110, or that information may be downloaded using the wireless router 114 or the antenna 118 before a connection is lost near the lake 112.

The customer device 102 may be in communication with the server 108 to receive a contextual recommendation, such as a location-based recommendation. For example, the customer device 102 may determine a location or location context information 106 of the customer device 102, and send the information to the server 108 (e.g., via the app 104, via a background service, via a text message, over a phone call connection, or the like). The server 108 may determine a location-based recommendation and send it to the customer device 102. In an example, the location-based recommendation may be sent via a communication to the customer device 102 according to a routing protocol. For example, the routing protocol may recommend calling the customer device 102, sending a text message to the customer device 102, pushing a notification via the app 104, or the like.

In an example, the location context information 106 may include locations of entities other than the customer or the customer device 102. For example, the location context information 106 may include locations of family members or friends, such as those in a network or predetermined group. The locations of the family members or friends may include contextual information about the locations of the family members or friends. For example, if the customer is a parent and the location context information 106 includes information about a child in near proximity to a disaster or catastrophe, the parent may be alerted to send money (e.g., for a hotel, car, or plane ticket to flee the disaster area). For example, the customer may have a child at college who may not be accessing a bank-specific ATM and may be incurring ATM charges or fees. The customer may be alerted to a bank-specific ATM that is near the child so that the customer (e.g., who may be the one paying the charges or fees) may save that money by directing the child (e.g., who may not have access to location-based recommendations) to the bank-specific ATM.

In an example, aspects of a customer account may be modified in response to determining that location context information 106 indicates a potential issue with access to typical banking methods. For example, the credit limit of a credit card or the withdrawal limit of a debit card may be temporarily raised when access to an ATM or bank branch may be limited for a period of time (e.g., because of weather, a power outage, etc.). In another example, a temporary loan may be granted to a customer (e.g., in a disaster area), such as for emergency provisions, car rental, hotel, etc.

Figure 2:
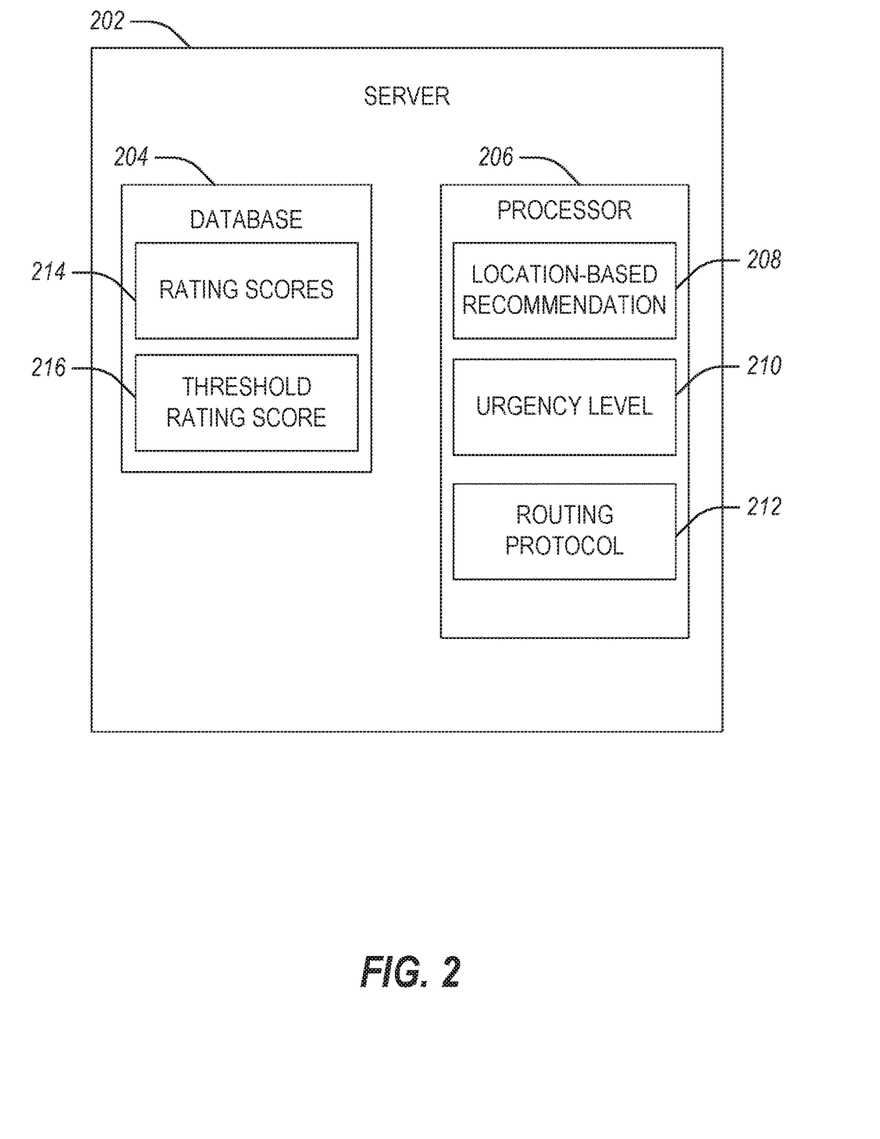
FIG. 2 illustrates a contextual recommendation server in accordance with some embodiments.

FIG. 2 illustrates a contextual recommendation server 202 in accordance with some embodiments. The server 202 includes a database 204 and a processor 206. In an example, the server 202 is a cloud service including a plurality of databases or a plurality of processors. The processor 206 may receive, from a customer device, contextual location information about a customer and an interaction type. In an example, the contextual location information includes news information or weather information. In another example, the contextual location information includes social media information associated with the customer. The interaction type may represents a telephone call from the customer, a text message received from the customer, an indication received via a mobile app, or the like. In an example, the interaction type is a passive interaction.

The processor 206 may determine a location-based recommendation 208 and an urgency level 210 for the customer using the contextual location information. In an example, the location-based recommendation 208 includes a financial incentive for a product related to the contextual location information. In another example, the location-based recommendation 208 includes directions to a mobile response unit when the weather information indicates severe weather. The location-based recommendation 208 may include an indication of a temporarily raise on an ATM card withdrawal limit or an advertisement for a car rental service. In an example, the processor 206 may retrieve historical communication information associated with the customer, and compare the historical communication information with the contextual location information to determine the location-based recommendation 208. The historical communication information may include a preregistered travel profile. The processor 206 may determine that a location associated with the preregistered travel profile does not correspond with the contextual location information and cancel at least one of a financial transaction, a credit card, or a debit card. The preregistered travel profile or the historical communication information may be stored in the database 204.

The processor 206 may generate a routing protocol 212 for communication with the customer based on the interaction type and the urgency level 210. To determine the urgency level 210, the processor 206 may analyze speech characteristics of the customer within a telephone call or analyze voice characteristics of the customer within a telephone call. In an example, the routing protocol 212 indicates the customer will be connected with one of a plurality of financial departments, such as an investment banking department, a loan department, a wealth management department, an insurance department, a personal banking department, or a commercial banking department. The processor 206 may provide a communication to the customer according to the routing protocol 212, the communication including the location-based recommendation 208.

The urgency level 210 may be dependent on severity of conditions at a location. The urgency level 210 may depend on the type of interaction or the type of recommendation. For example, if severe weather is impending at the location, the urgency level for accessing an ATM before the severe weather may be high. In another example, the urgency level 210 may be low if a customer is actively looking for vacation planning information for a vacation scheduled far in the future. In yet another example, the urgency level 210 may be determined based on attributes of the customer, such as a priority level, account history, or recent transactions. The urgency level 210 may depend on a predicted likelihood of a transaction being fraudulent. The urgency level 210 may include a rating score, and may be compared to previous rating scores 214 or a threshold rating score 216 stored in the database 204. The previous rating scores 214 may be stored in the database 204 including values, an average, a standard deviation, a weighted mean, etc. The threshold rating score 216 may include a plurality of thresholds for different urgency levels (e.g., a first threshold separating a low and a medium urgency level, a second threshold separating a medium and a high urgency level, or the like). The threshold rating score 216 may be based on the rating scores 214 or may be based on other factors, such as interaction type, location context information, recommendation, or the like.

Figure 3:
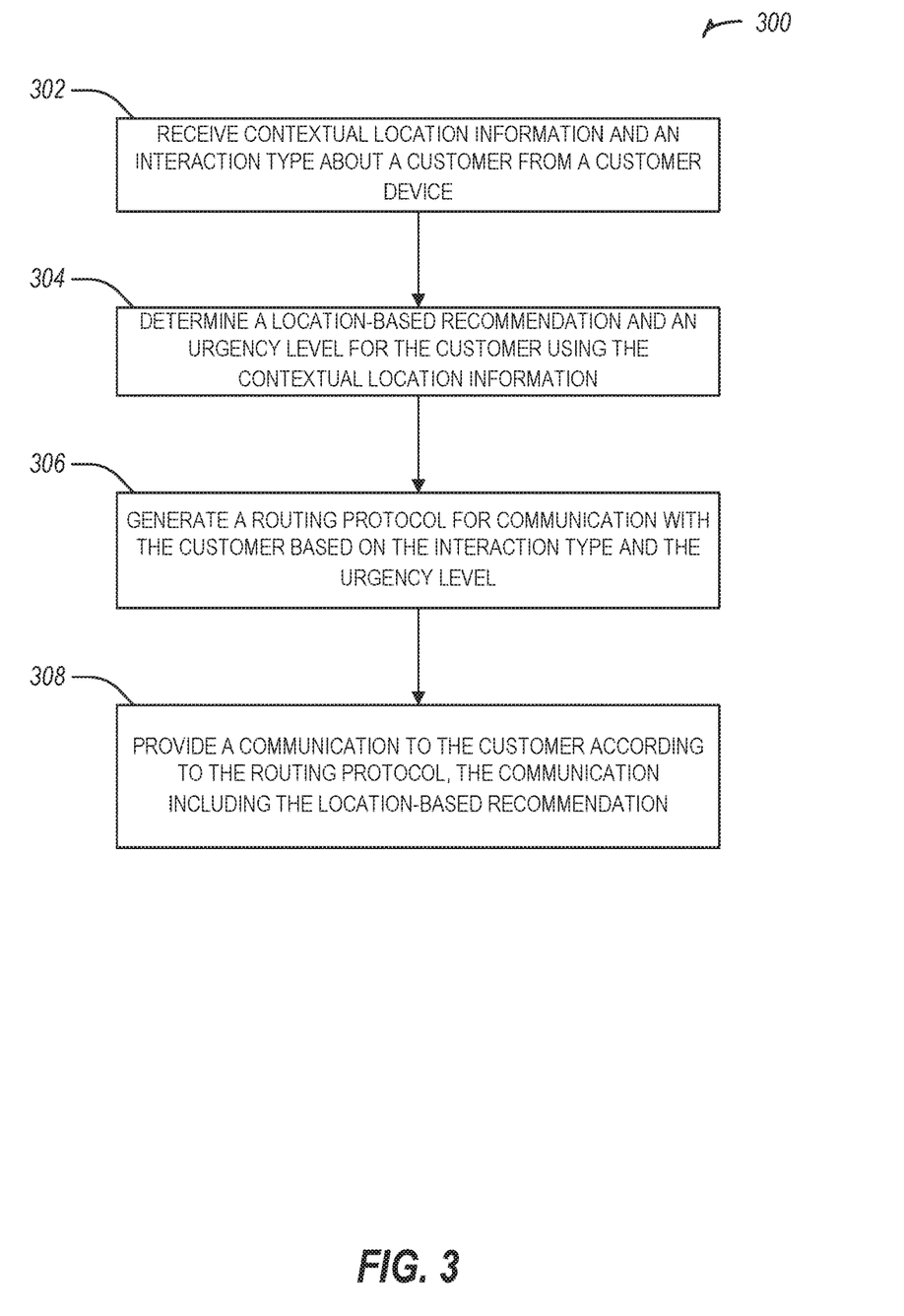
FIG. 3 illustrates a flowchart showing a technique for providing contextual recommendations in accordance with some embodiments.

FIG. 3 illustrates a flowchart showing a technique 300 for providing contextual recommendations in accordance with some embodiments. The technique 300 includes an operation 302 to receive, from a customer device, contextual location information about a customer and an interaction type. In an example, the contextual location information includes news information or weather information. In another example, the contextual location information includes social media information associated with the customer. The interaction type may represents a telephone call from the customer, a text message received from the customer, an indication received via a mobile app, or the like. In an example, the interaction type is a passive interaction.

The technique 300 includes an operation 304 to determine a location-based recommendation and an urgency level for the customer using the contextual location information. In an example, the location-based recommendation includes a financial incentive for a product related to the contextual location information. In another example, the location-based recommendation includes directions to a mobile response unit when the weather information indicates severe weather. The location-based recommendation may include an indication of a temporarily raise on an ATM card withdrawal limit or an advertisement for a car rental service. In an example, the technique 300 may include retrieving historical communication information associated with the customer, and comparing the historical communication information with the contextual location information to determine the location-based recommendation. The historical communication information may include a preregistered travel profile. The technique 300 may include determining that a location associated with the preregistered travel profile does not correspond with the contextual location information and canceling at least one of a financial transaction, a credit card, or a debit card. The preregistered travel profile or the historical communication information may be stored in a cloud-implemented database. In an example, determining the urgency level includes analyzing speech characteristics of the customer within a telephone call or analyzing voice characteristics of the customer within a telephone call.

The technique 300 includes an operation 306 to generate a routing protocol for communication with the customer based on the interaction type and the urgency level. In an example, the routing protocol indicates the customer will be connected with one of a plurality of financial departments, such as an investment banking department, a loan department, a wealth management department, an insurance department, a personal banking department, or a commercial banking department. The routing protocol may include a mapping of potential customer interactions and a selection of a route of customer interactions from the mapping based on the interaction type and the urgency level. For example, the routing protocol may include providing a direct telephone line to a banker when an urgency level is high and the interaction type is a phone call. In another example, when the urgency level is high and the interaction type is passive, the routing protocol may include an alert pushed to a mobile device from an app or a text message. The technique 300 includes an operation 308 to provide a communication to the customer according to the routing protocol, the communication including the location-based recommendation.

Figure 4:
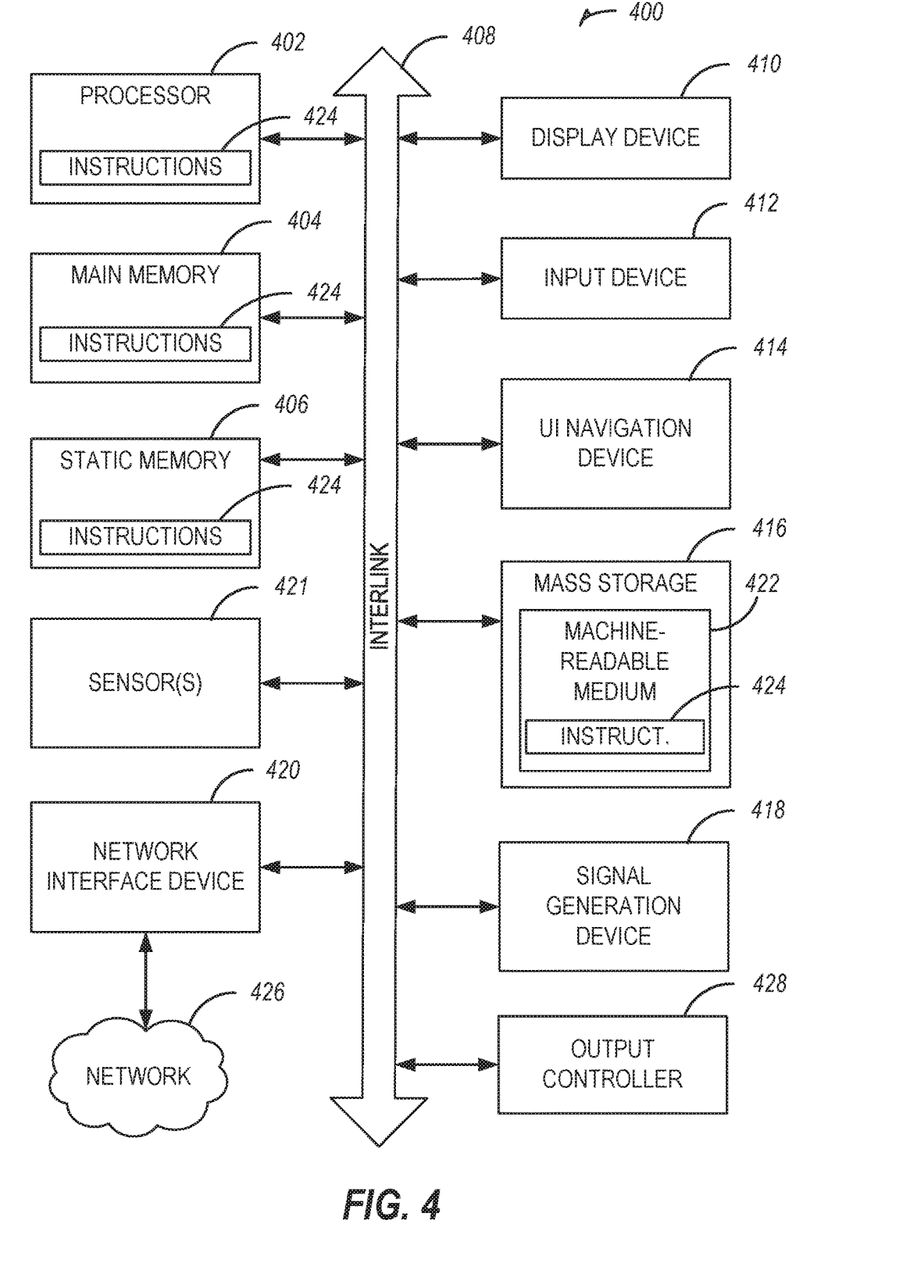
FIG. 4 illustrates generally an example of a block diagram of a machine upon which any one or more of the techniques (e.g., methodologies) discussed herein may perform in accordance with some embodiments.

FIG. 4 illustrates generally an example of a block diagram of a machine 400 upon which any one or more of the techniques (e.g., methodologies) discussed herein may perform in accordance with some embodiments. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, alphanumeric input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 that is non-transitory on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A system for providing contextual recommendations, the system comprising:
   a server, including a processor to:
   receive, from a customer device, contextual location information about a customer and an interaction type;
   determine a location-based recommendation and an urgency level for the customer using the contextual location information;
   generate a routing protocol for communication with the customer based on the interaction type and the urgency level; and
   provide a communication to the customer according to the routing protocol, the communication including the location-based recommendation.

2. The system of claim 1, wherein the location-based recommendation includes a financial incentive for a product related to the contextual location information.

3. The system of claim 1, wherein the contextual location information includes news information.

4. The system of claim 1, wherein the contextual location information includes weather information.

5. The system of claim 4, wherein the location-based recommendation includes directions to a mobile response unit when the weather information indicates severe weather.

6. The system of claim 1, wherein the location-based recommendation includes an indication of a temporarily raise on an ATM card withdrawal limit.

7. The system of claim 1, wherein the location-based recommendation includes an advertisement for a car rental service.

8. The system of claim 1, wherein the contextual location information includes social media information associated with the customer.

9. A method for providing contextual recommendations, the method comprising:
- receiving, from a customer device, contextual location information about a customer and an interaction type;
- determining a location-based recommendation and an urgency level for the customer using the contextual location information;
- generating a routing protocol for communication with the customer based on the interaction type and the urgency level; and
- providing a communication to the customer according to the routing protocol, the communication including the location-based recommendation.

10. The method of claim 9, wherein the interaction type represents a telephone call from the customer.

11. The method of claim 10, wherein determining the urgency level includes analyzing speech characteristics of the customer within the telephone call.

12. The method of claim 10, wherein determining the urgency level includes analyzing voice characteristics of the customer within the telephone call.

13. The method of claim 9, wherein the interaction type represents an indication received via a mobile app.

14. The method of claim 9, wherein determining the location-based recommendation includes:
- retrieving historical communication information associated with the customer; and
- comparing the historical communication information with the contextual location information.

15. The method of claim 14, wherein the historical communication information includes a preregistered travel profile.

16. The method of claim 15, further comprising:
- determining that a location associated with the preregistered travel profile does not correspond with the contextual location information; and
- canceling at least one of a financial transaction, a credit card, or a debit card.

17. A non-transitory machine-readable medium including instructions for providing contextual recommendations, which when executed by a machine, cause the machine to:
- receive contextual location information and an interaction type about a customer from a customer device;
- determine a location-based recommendation and an urgency level for the customer using the contextual location information;
- generate a routing protocol for communication with the customer based on the interaction type and the urgency level; and
- provide a communication to the customer according to the routing protocol, the communication including the location-based recommendation.

18. The machine-readable medium of claim 17, wherein the routing protocol indicates the customer will be connected with one of a plurality of financial departments.

19. The machine-readable medium of claim 18, wherein the one of the plurality of financial departments includes one of an investment banking department, a loan department, a wealth management department, an insurance department, a personal banking department, or a commercial banking department.

20. The machine-readable medium of claim 17, wherein the interaction type is a passive interaction.

* * * * *